March 15, 1966 W. J. McGINLEY ET AL 3,239,915

METHOD OF FORMING EMBOSSED ELECTRIC CIRCUITS

Filed Sept. 11, 1961

INVENTORS
WILLIAM J. MC GINLEY
BY HOWARD G. SPANNAGEL
Kemon, Palmer, Stewart & Estabrook
ATTORNEYS United States Patent Office 3,239,915

Patented Mar. 15, 1966

3,239,915
METHOD OF FORMING EMBOSSED ELECTRIC CIRCUITS

William J. McGinley, Palatine, and Howard G. Spannagel, Westmont, Ill., assignors to Methode Electronics, Inc., Chicago, Ill., a corporation of Illinois Filed Sept. 11, 1961, Ser. No. 137,148
4 Claims. (Cl. 29—155.5)

Figures 1, 2:
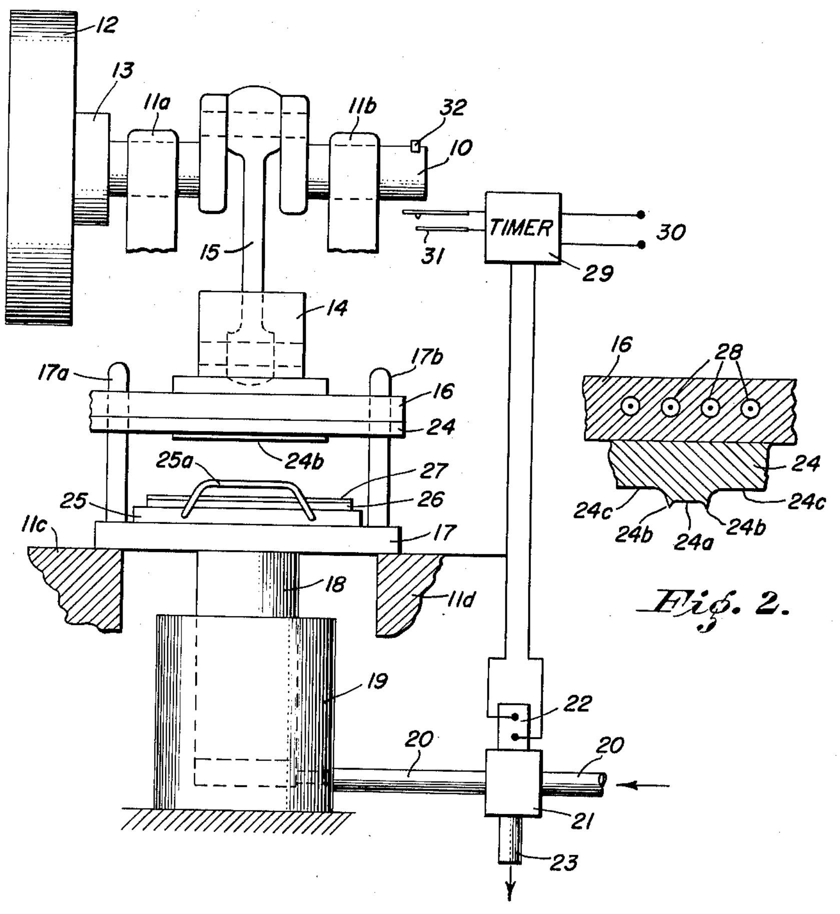

This invention relates to the manufacture of "embossed printed circuits" and to the method by which such circuits may be given more dependable electrical and mechanical characteristics.

To explain the problems which are involved in the manufacture of such circuitry, it should be understood that although the term "embossed printed circuit" is the popular and trade name for circuits which are so manufactured, it is a misnomer. The circuit is not printed on the dielectric base or backing board and neither the circuitry nor the dielectric is embossed to a significant degree. On the contrary, the desired circuitry pattern is die-cut and adhesively secured to the dielectric base or backing board in one single operation.

It has been past experience that under certain conditions such circuitry has shown a rather high instance of ultimate mechanical and electrical failure. Stresses which have been set up in the die cutting operation and strains which have been imposed in stripping the unwanted waste from the circuitry pattern have often led to cracks in the foil circuit elements which in time destroy their electrical continuity. Additionally, and especially when thermoplastic adhesives have been used, thermal stresses have caused portions of the foil circuitry to pull itself loose from its dielectric support at the time that other circuit elements are soldered into the basic circuit pattern.

It is the purpose of this invention to produce die-cut and adhesively secured circuit patterns rapidly and inexpensively and at the same time to prevent excessive stress from being imposed on the foil either in the die-cutting or in the waste stripping operations; and to secure superior adhesive attachment of the circuitry to its base.

According to the method of our invention the embossing is carried out by means of a positive-action mechanical press which is driven through a complete and invariable cycle upon each actuation thereof. The backing board or circuit base is supported on a solid or rigid and un-yielding bed at the time the cutting die engages the copper foil and cuts the circuit pattern. The use of a solid or fixed bed for supporting the circuit base or board ensures a substantial impact of the die against the foil-covered board and effects a sharp cut-off of the circuit pattern. After this, the bed is moved upwardly under yielding or squeezing pressure to hold the foil and circuit base in contact with the heated die on the return stroke of the die and for a sufficient time thereafter to effect the required curing of the adhesive. This results in a bond between the foil and the board or base which is much superior to that obtained where the die is merely held in contact with the board under a static load.

The invention will be described below in greater detail by reference to the accompanying drawing in which FIGURE 1 is a diagrammatic showing of an apparatus for carrying out the invention, and FIGURE 2 is a sectional view on an enlarged scale of a portion of the die for forming the embossed circuit.

One example of a positive-action press suitable for carrying out the invention is illustrated in the accompanying drawing where the frame of the press is shown in fragments and other elements are shown in diagrammatic form.

The press involves a crankshaft 10 mounted in bearings supported by frame parts 11a and 11b and is driven from a constantly rotating flywheel 12 through a conventional one-revolution clutch 13. Normally, between operating cycles, the crankshaft 10 is disconnected from the flywheel 12 and is in the position shown in the drawing with the crank at the upper end of its throw. The ram 14 of the press is mounted below the crank and is guided for the vertical movement by suitable guideways not shown. The ram 14 is driven from the crankshaft 10 by the connecting rod 15 for vertical reciprocation through a fixed throw. The upper platen 16 of the press is secured to the lower face of the ram 14, and the lower platen 17 is supported by rigid frame parts 11c and 11d which form a rigid bed for platen 17. Accurate register of the upper and lower platens is insured by vertical guide-posts 17a and 17b carried by the lower platen 17 and passing through holes formed in the upper platen 16. Preferably there would be four such guide-posts at the corners of platen 17. The lower platen 17 is mounted upon the upper end of a plunger 18 of a pneumatic or hydraulic cylinder 19 which is supplied with fluid under pressure through a supply conduit 20 under the control of a two-way valve 21 which is operated by an electromagnet 22. When the electromagnet 22 is energized, valve 21 is operated to admit fluid under pressure to cylinder 19, and when the electromagnet is de-energized valve 21 returns to its normal position and connects the cylinder 19 to an exhaust conduit 23.

On the lower face of the upper platen 16 is mounted the die plate 24 which carries on its lower face the raised knife-edge portions 24b which outline the printed circuit strips to be embossed on the backing board or base. Removably supported on the lower platen 15 is the die bed 25 which is formed of dense material, such as hard metal, and provides a rigid solid backing for the backing-board or base 26 which carries on its upper face a sheet of foil 27, the lower face of the foil being coated with a suitable adhesive. For the purpose of loading the press during each cycle of operation, the bed-plate 25 is removable from the press, and for this purpose it is provided with a suitable handle 25a mounted on the front edge thereof and extending outwardly and upwardly at the front of the press. It will be understood that the bed-plate 25 is correctly positioned on the lower platen 17 by suitable locating pins or strips not shown. Likewise, the circuit backing-board 26 is also correctly positioned on the bed-plate 25 by suitable positioning means not shown. It will be understood that the upper face of the bed-plate 25 will be shaped or contoured to conform with the shape of the circuit backing-board 26, and will provide complete back-up support to all portions of the base 26 to which pressure will be applied.

The base of insulating material to which circuit elements are to be applied and which hereafter will be referred to as the circuit "base" may be a sheet 26 of compressed, infusible, resin laminate or may be a molded piece of any configuration.

The metallic foil sheet 27, previously coated on one side with an adhesive, and which has been pre-cut in outline to cover the circuit area, is placed on the base 26, with its adhesively coated side in contact with the base. When the adhesive is heated under pressure, it will cure to an infusible, thermoset condition and adhere the foil circuit elements to the dielectric base.

Top platen 16 is provided with means for heating the platen such as imbedded electrical heating elements 28 (FIG. 2), or if the platen is to be heated as, for example, by steam, by steam passages which are similarly located.

The die 24, is a separate metallic plate usually covering a major portion of the lower surface of the platen 16, to provide good thermal transmission and is fastened to platen 16 by cap screws or other appropriate holding means which are not shown.

The contour of the working face of die 24 is important, as will be explained in connection with FIGURE 2 which is a transverse section of a portion of the die which forms a single circuit strip beneath the raised die face 24*a*. At the margins of die face 24*a* are knife edges 24*b*–24*b*, which project below the face 24*a* a distance which is somewhat in excess of the thickness of the foil 27. All the background areas of the die are substantially cut back as shown at 24*c*, so that no foil waste comes in contact with the die 24 when the press is closed.

To form the circuit, the loaded bed-plate 25 is slid into position on lower platen 17. The operator trips the clutch and the ram descends carrying with it the die, which uninterruptedly completes its stroke and returns immediately to its raised position.

On the upward stroke of ram 14 the bed-plate 25 is raised to maintain the circuit base 26 in contact with the die, as explained above, and this is accomplished by controlling valve 22 in timed relation with the operation of the press. For example, the energizing circuit of electromagnet 22 is controlled by a conventional timer 29 which connects the circuit of valve 22 to a supply circuit 30 and energizes the valve circuit for a predetermined time which is adjustable. Timer 29 is controlled by a suitable switch 31 which could be of the micro-switch type. This switch is normally open and is located adjacent the end of crank shaft 10 and in a position to be closed by a cam element 32 mounted on the shaft 10 in such position that it closes the switch 31 when the ram 14 reaches the bottom of its stroke. The timer 29 includes a contact which bypasses switch 31 and remains closed until the end of the timing cycle, at which time the timer is restored for another cycle of operation. Operation of valve 21 admits fluid under pressure to cylinder 19 and causes plunger 18 to move upwardly, maintaining upward pressure on the bed-plate 25 throughout the cycle of timer 29.

Because the plate 25 lifts as the ram 14 recedes, die 24 does not separate from the foil 27. Instead, the plate 25, the dielectric base 26, and the foil 27 rise as a unit following up the motion of the platen 16 as the ram 14 returns to its raised position.

The consequence of the upward motion of the bed-plate 25 is that the compression which was exerted upon the foil in the die areas 24*a* between the knife edges 24*b*–24*b* is not relaxed. Instead, upward pressure is exerted by the plunger 18 which maintains the foil 27 and the adhesive layer on the lower face of the foil under heat and pressure contact with the dielectric base 26 until the adhesive layer is fully cured.

The time of cure is variable and depends upon the nature of the adhesive which is employed. Some formulations cure in about 45 seconds at 150° C. After the proper time interval, which is pre-set at timer 29, the device times out, opening the circuit of electromagnet 22 and releasing valve 21. Fluid in cylinder 19 is then released through the exhaust port of the valve to conduit 23. Plunger 18 drops and comes to rest with bed-plate 25 resting on lower platen 17 which in turn is supported upon rigid frame parts 11*c* and 11*d*. Accordingly, when the press delivers its power cutting stroke, the work piece is rigidly backed by a rigid and un-yielding mechanical support.

The stroke adjustment of the press should be set so that the stroke terminates in a sharp impact sufficient to drive the knife edges 24*b* of the die cleanly through the foil 27 and its adhesive coating and bite into the dielectric base 26 but not so deeply, however, as to shatter or to damage the base 26. The circuit pattern is thus cleanly severed from the foil sheet and since the waste areas of the foil located beneath the relieved portions 24*c* are not subjected to pressure and are not in heat transmitting contact with the die, they do not adhere to the dielectric base and are cleanly lifted from the base when the support plate 25 drops to its lower position.

Variations in piece-to-piece thickness of the dielectric base should be held to a reasonable tolerance in order that the foil held under the die areas 24*a* shall be driven into firm contact with the dielectric base by the stroke of the press. The penetration of the knife edges 24*b* into the dielectric base should ordinarily be kept to the minimum which will secure a clean and continuous cut. Usually, this may vary from about two thousandths of an inch, to ten thousandths of an inch.

In certain circumstances, the foil is not directly coated with a thermosetting type of adhesive. Instead, the adhesive is supplied in sheet form. A sheet of this adhesive, cut to the same pattern as the foil, is sandwiched between the foil and the dielectric base. There it is fused and is cured in the same manner as is an adhesive coating directly applied to the foil. This process is equally workable whether sheet adhesive or adhesive-coated foils be used.

The electro-magnetic valve, the electrical time-out device, and the micro-switch are commercial units and are wired in a conventional manner. Units which operate solely by pneumatic energy are also commercially available and will perform the energizing and timing functions equally as well as the electric components which have been described. Their use instead of the electric apparatus is optional.

Among the advantages of this invention may be mentioned: Firstly, conventional punch presses of the positive-action mechanical type may be used as the basic machine. These are much less costly and more positive in action. Secondly, die 24 does not separate from the foil while the adhesive coating is soft. Thirdly, the solid blow struck by the punch press drives the knife edges into the dielectric base completely severing all waste from the circuitry, and, as the die follows through to the end of its stroke, die face areas 24*a* exert a compacting pressure on the foil and its adhesive layer. Since the foil is not stretched to a significant extent by this operation, excessive stress is not imposed and incipient cracks are not started. Fourthly, since the circuit area under the die face areas 24*a* is maintained under constant pressure until the cure of the adhesive is complete, no looseness develops due to the pullaway of the die. Additionally, the complete cure of the adhesive to an infusible state prevents any loosening of the adhesive from the dielectric base when any subsequent soldering operations occur. The dependability of the electrical circuitry is consequently greatly improved.

We claim:

1. The method of die-cutting and simultaneously adhesively securing foil circuit elements to a dielectric base which consists in providing a punch press with a mechanically driven reciprocating ram carrying a heated cutting die, providing a workpiece support capable of advancing with the retreating stroke of the ram of the press, superposing on a thermoset dielectric base a sheet of metallic foil and a thermosetting adhesive between the foil and the base, placing the base and foil assembly on the workpiece support and beneath the die, driving the ram to force the die into the foil to sever circuit elements from the remainder of the sheet and force the circuit elements into contact with the dielectric base, then applying upward pressure to raise the support to maintain heat and pressure contact of the die with the foil during the retreating stroke of the ram and maintaining the heat and pressure contact for a dwell period of sufficient duration to cure the adhesive to a thermoset condition, and subsequently lowering the support by releasing the pressure on the workpiece support.

2. The method of adhesively securing die-cut electrical circuit elements to a dielectric base which consists in providing a die carrying a raised circuit pattern and having each circuit element outlined by a projecting marginal portion terminating in a cutting edge, affixing the die to the ram of a punch press, heating the die to a resin curing temperature, placing a sandwich comprising a thermoset dielectric base, a thermosetting adhesive layer and a metallic foil beneath the die, operating the press through a complete stroke to cut the foil along the lines of the circuit pattern, withdrawing the die from its cutting position in the press and maintaining heat and pressure contact of the sandwich with the circuit elements of the die face by applying upward pressure on the dielectric base to move the dielectric base upwardly with the die and maintain contact with the die from the moment of die contact with the foil to a time when the adhesive has become a thermoset substance, and then releasing said upward pressure.

3. The method of claim 2 wherein the dielectric base is rigidly supported by a bed formed of hard material resting on a rigid mechanical support at the moment of impact of the die with the dielectric base.

4. In the art of forming circuit elements from metal foil and bonding said circuit elements to one face of a dielectric base by a thermo-setting adhesive by a process in which the dielectric base with a sheet of metallic foil applied to one face thereof and a thermo-setting adhesive between the foil and the base is supported upon a platen normally resting in a fixed supported, and in which a heated foil-cutting die is moved from a normal position into cutting engagement with the metallic foil to cut the circuit elements from the foil and is returned to normal position in each cutting operation, a method of increasing the curing time during each cutting operation of said die which comprises raising said platen during the return movement of said die and maintaining said foil sheet in contact with the heated die throughout the return movement of said die to its normal position, and continuing to press the foil sheet into engagement with said heated die for a dwell period of sufficient duration to cure the adhesive to a thermo-set condition.

References Cited by the Examiner

UNITED STATES PATENTS

| | | | |
|---|---|---|---|
| 2,382,046 | 8/1945 | Flowers et al. | 113—42 |
| 2,545,570 | 3/1951 | Caldwell | 113—42 |
| 2,716,268 | 8/1955 | Steigerwalt | 29—155.5 |
| 2,753,619 | 7/1956 | Franklin | 29—155.5 |
| 2,971,249 | 2/1961 | Anderson et al. | 29—155.5 |

WHITMORE A. WILTZ, *Primary Examiner.*

JOHN F. CAMPBELL, *Examiner.*